United States Patent
Neff

(10) Patent No.: US 6,654,692 B1
(45) Date of Patent: Nov. 25, 2003

(54) METHOD OF PREDICTING ROCK PROPERTIES FROM SEISMIC DATA

(75) Inventor: Dennis B. Neff, Grove, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/302,268

(22) Filed: Nov. 21, 2002

(51) Int. Cl.[7] .............................. G06F 19/00
(52) U.S. Cl. .............................. 702/11; 702/7
(58) Field of Search .................. 702/11, 10, 16, 702/7, 6, 17, 14; 367/47, 38, 31

(56) References Cited

U.S. PATENT DOCUMENTS

| | | | |
|---|---|---|---|
| 5,487,001 A | * 1/1996 | Neff et al. | 702/14 |
| 5,661,697 A | 8/1997 | Swan et al. | 367/47 |
| 5,835,883 A | * 11/1998 | Neff et al. | 702/7 |
| 5,862,100 A | 1/1999 | VerWest | 367/38 |
| 6,058,073 A | 5/2000 | VerWest | 367/31 |
| 6,058,074 A | 5/2000 | Swan et al. | 367/38 |
| 6,092,025 A | 7/2000 | Neff | 702/10 |
| 6,192,316 B1 | * 2/2001 | Hornby | 702/6 |
| 6,240,370 B1 | * 5/2001 | Sonneland et al. | 702/17 |
| 6,289,285 B1 | 9/2001 | Neff et al. | 702/16 |

* cited by examiner

Primary Examiner—Kamini Shah
Assistant Examiner—Victor J. Taylor
(74) Attorney, Agent, or Firm—Kameron D. Kelly

(57) ABSTRACT

A computer-implemented method of predicting rock properties of a subsurface formation using reflection seismic data and well log data. Synthetic seismic data is generated from the well log data and quantized into discrete synthetic data subcells based on rock property-predictive seismic attributes of the synthetic seismic data. The reflection seismic data is also quantized into discrete reflection data subcells based on the same seismic attributes used to quantize the synthetic seismic data. Each reflection data subcell is correlated with a corresponding synthetic data subcell based on the seismic attributes of the reflection and synthetic seismic data. A statistical distribution of well log properties associated with the synthetic seismic data subcells is then assigned to corresponding reflection data subcells, which can be viewed as 2D seismic lines, 3D seismic volumes, or single data point histograms.

42 Claims, 14 Drawing Sheets

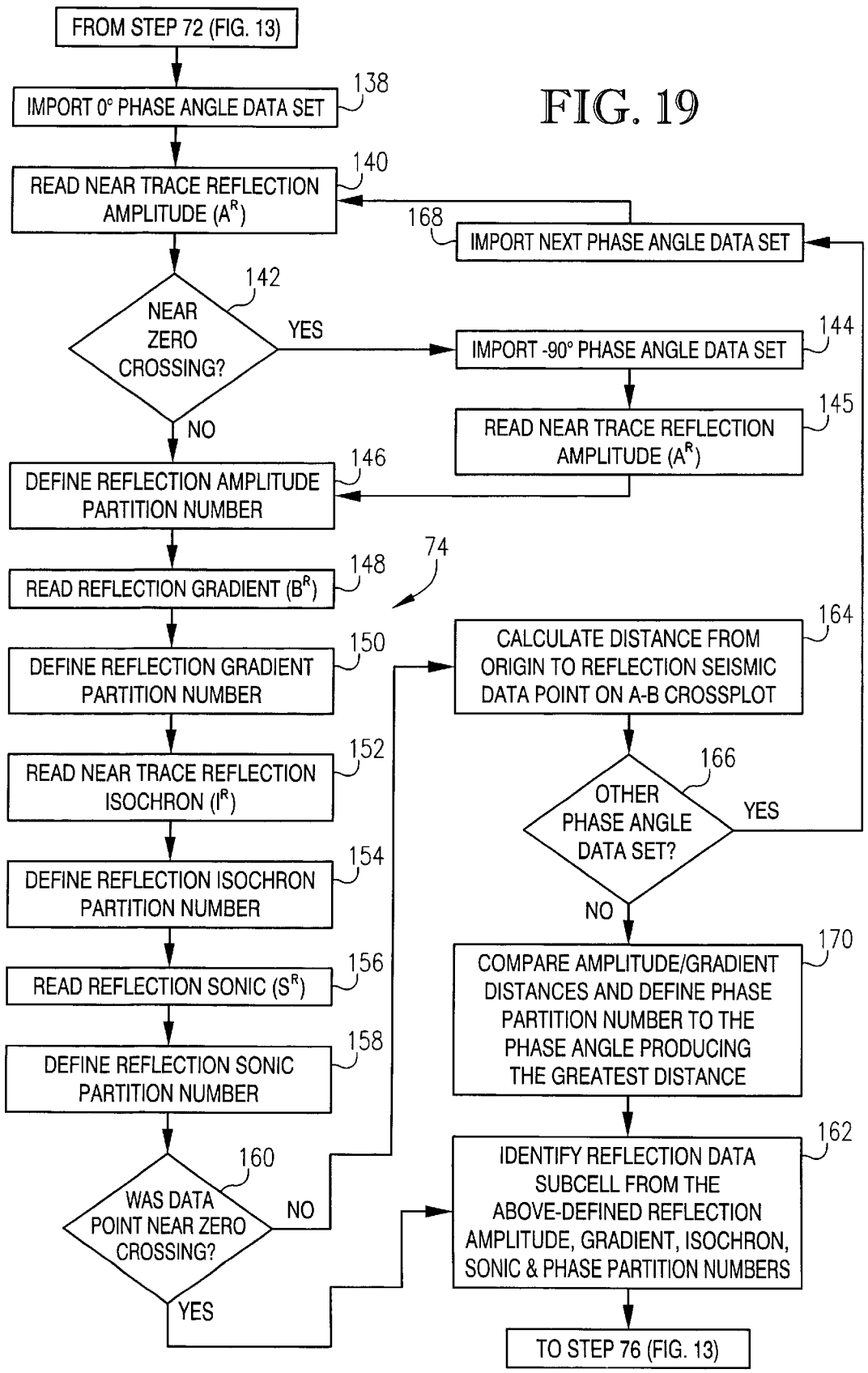

METHOD OF PREDICTING ROCK PROPERTIES FROM SEISMIC DATA

BACKGROUND OF THE INVENTION

1. Field of the Invention

The present invention relates generally to methods of predicting subterranean rock properties from reflection seismic data. In another aspect, the invention concerns a system for predicting lithology and pore fluid of a subterranean formation based on reflection seismic data and well log data.

2. Description of the Prior Art

The use of seismic surveys is now fundamental in the search for oil and gas reservoirs in the earth. Seismic surveys are typically performed by imparting acoustic energy of a known amplitude and frequency pattern at one or more locations of the earth (either at a land surface or in a marine environment) and then detecting reflected and refracted acoustic energy at other locations. The time delay between the imparting of the acoustic energy at the source location and the detection of the same wave at a receiver location is indicative of the depth at which a particular reflecting geological interface is located. The field of seismic data interpretation is concerned with techniques for analyzing the detected seismic waves to determine both the location and the properties of various geological strata.

While reflection seismic data has been very successful in determining the location of certain geological strata, changes in reservoir petrophysical properties (i.e., rock properties) are typically difficult to determine from the reflection seismic data due to the limited amount of information that these properties provide in the reflected signal. However, amplitude-versus-offset (AVO) analysis is a well-known technique that can be used to make predictions of petrophysical properties from reflection seismic data. According to one aspect of the AVO approach, subsurface petrophysical properties can be estimated by calculating the zero-offset amplitude (A) of reflected seismic energy and the gradient (B) (i.e., rate of change in amplitude with offset) of the reflected seismic energy. The product A*B is thought to give an indication of the presence of certain hydrocarbon-bearing sand formations. Further, the location of a reflection seismic data point plotted on an A-B graph (with zero-offset amplitude as the x-axis and gradient as the y-axis) can provide an indication of subsurface petrophysical properties based on the location of the plotted reflection seismic data point relative to a known background trend. Although such AVO analysis can be helpful in estimating petrophysical properties in certain instances, the predictions from conventional AVO analysis are many times inaccurate and/or incomplete. Accordingly, using reflection seismic data alone, it is difficult to identify rock properties that provide an indication of successful oil and gas production from a reservoir.

Various methods of employing well log data to complement and improve the accuracy of predictions made from reflection seismic data are well known in the art. Such methods generally involve obtaining depth-scale well logs which include data such as lithologic composition, porosity, density, and liquid saturation. From these logs, synthetic time-scale seismic traces can be computed. These synthetic traces are useful for demonstrating to geophysicists what a reflection seismic time-scale trace should look like in the presence of the geologic conditions at or near the subsurface location from which the well log was obtained.

Most traditional techniques for matching reflection seismic data to synthetic data generated from well logs provide only a single predicted answer for the petrophysical properties at any given location. Thus, conventional seismic inversion schemes do not provide results that can be statistically analyzed for purposes of risk evaluation. Further, some conventional seismic inversion techniques require mathematically complex techniques for matching reflection seismic traces with synthetic seismic traces. Such complex computational processes can require expensive high-end computers and can take long periods of time to perform.

OBJECTS AND SUMMARY OF THE INVENTION

It is, therefore, an object of the present invention to provide a method for more accurately predicting rock properties of a subsurface formation from reflection seismic data and well log data.

Another object of the invention is to provide a method for predicting rock properties of a subsurface formation using seismic attributes that can readily be determined from conventional P-wave seismic surveys and that are most predictive of formation petrophysical properties.

Still another object of the present invention is to provide a method for predicting rock properties of a subsurface formation that provides results which can be statistically analyzed for purposes of risk evaluation.

A still further object of the invention is to provide a more efficient method of inverting reflection seismic data using synthetic seismic data that is mathematically simple and does not require long periods of time and/or high-powered computer systems to perform.

It should be understood that the above-listed objects need not all be accomplished by the invention claimed herein. Further objects and advantages of the present invention will be apparent from the detailed description of the preferred embodiment, the claims, and the drawing figures.

Accordingly, in one embodiment of the present invention, there is provided a computer-implemented method of predicting rock properties of a subsurface formation using reflection seismic data and well log data. The method comprises the steps of: (a) generating synthetic seismic data from the well log data; (b) quantizing the synthetic seismic data into discrete synthetic data subcells based on seismic attributes of the synthetic seismic data, with the seismic attributes (e.g., near trace amplitude, gradient, isochron, sonic, and phase angle) being predictive of rock properties; (c) quantizing the reflection seismic data into discrete reflection data subcells based on the same seismic attributes that were used to quantize the synthetic seismic data; (d) correlating each reflection data subcell with a corresponding synthetic data subcell based on the seismic attributes of the reflection and synthetic seismic data; and (e) assigning a statistical distribution of well log rock properties associated with the synthetic seismic data subcells to corresponding reflection data subcells.

In accordance with another embodiment of the present invention, there is provided a computer-implemented method of predicting rock properties of a subterranean formation using reflection seismic data and well log data. The method comprises the steps of: (a) generating synthetic seismic data from the well log data; (b) calculating synthetic seismic attributes from the synthetic seismic data, with the synthetic seismic attributes including synthetic amplitude, gradient, and at least one additional synthetic attribute selected from the group consisting of synthetic phase angle, isochron, and sonic; (c) calculating reflection seismic attributes from the reflection seismic data, with the reflection seismic attributes including reflection amplitude, gradient, and at least one additional reflection attribute selected from the group consisting of reflection phase angle, isochron, and sonic; (d) quantizing the synthetic and reflection seismic data into an equal number of synthetic and reflection data subcells so that each reflection data subcell corresponds to one synthetic data subcell based on the values of the synthetic and reflection seismic attributes; and (e) inverting at least a portion of the reflection seismic data by assigning well log data associated with the synthetic data subcells to reflection seismic data points landing in corresponding reflection data subcells.

In accordance with a further embodiment of the present invention, there is provided a computer-implemented method of predicting lithology and pore fluid of a subterranean formation using reflection seismic data and well log data. The reflection seismic data represents a surveyed volume of the formation. The well log data is either actual well log data taken within the surveyed volume or hypothetical well log data estimating expected rock properties of the surveyed formation. The method comprises the steps of: (a) generating synthetic seismic data from the well log data; (b) calculating synthetic amplitude and gradient values from the synthetic seismic data; (c) quantizing the synthetic seismic data into synthetic data subcells via partitioning of the synthetic amplitude and gradient values into user-defined numbers of amplitude and gradient partitions; (d) assigning the well log data associated with the synthetic seismic data to the synthetic data cells so that a plurality of synthetic data subcells have a statistical distribution of the well log data associated therewith; (e) observing the statistical distribution of the well log data for at least one synthetic data subcell to check the appropriateness of the number of amplitude and gradient partitions; (f) calculating reflection amplitude and gradient values from the reflection seismic data; (g) quantizing the reflection seismic data into reflection data subcells via partitioning of the reflection amplitude and gradient values into the same number of amplitude and gradient partitions as the synthetic amplitude and gradient values respectively; (h) defining amplitude and gradient scalars for approximately matching the reflection amplitude and gradient with the synthetic amplitude and gradient respectively; (i) comparing the fit between the synthetic amplitude and gradient and the reflection amplitude and gradient to check the appropriateness of the amplitude and gradient scalars; and A) inverting the reflection seismic data by assigning the statistical distribution of the well log data from the synthetic data subcells to reflection seismic data points landing in the corresponding reflection data subcells.

In accordance with still another embodiment of the present invention, there is provided a programmed storage device readable by computer. The device tangibly embodies a program of instructions executable by the computer for predicting rock properties of a subsurface formation using reflection seismic data and well log data. The program of instruction comprises the steps of: (a) generating synthetic seismic data from the well log data; (b) quantizing the synthetic seismic data into discrete synthetic data subcells based on seismic attributes of the synthetic seismic data, with the seismic attributes being predictive of rock properties; (c) quantizing the reflection seismic data into discrete reflection data subcells based on the same seismic attributes that were used to quantize the synthetic seismic data; (d) correlating each reflection data subcell with a corresponding synthetic data subcell based on the seismic attributes of the reflection and synthetic seismic data; and (e) assigning a statistical distribution of well log rock properties associated with the synthetic seismic data subcells to corresponding reflection data subcells.

In accordance with a still further embodiment of the present invention, there is provided an apparatus for predicting rock properties of a subsurface formation using reflection seismic data and well log data. The apparatus comprises a computer programmed to carry out the following method steps: (a) generating synthetic seismic data from the well log data; (b) quantizing the synthetic seismic data into discrete synthetic data subcells based on seismic attributes of the synthetic seismic data, with the seismic attributes being predictive of rock properties; (c) quantizing the reflection seismic data into discrete reflection data subcells based on the same seismic attributes that were used to quantize the synthetic seismic data; (d) correlating each reflection data subcell with a corresponding synthetic data subcell based on the seismic attributes of the reflection and synthetic seismic data; and (e) assigning a statistical distribution of well log rock properties associated with the synthetic seismic data subcells to corresponding reflection data subcells.

BRIEF DESCRIPTION OF THE DRAWING FIGURES

A preferred embodiment of the present invention is described in detail below with reference to the attached drawing figures, wherein:

FIG. 19 is an expanded flow chart outlining substeps of subcell identification substep 74 from FIG. 13, according to the second embodiment of the present invention.

DETAILED DESCRIPTION OF THE PREFERRED EMBODIMENT

Figure 1:
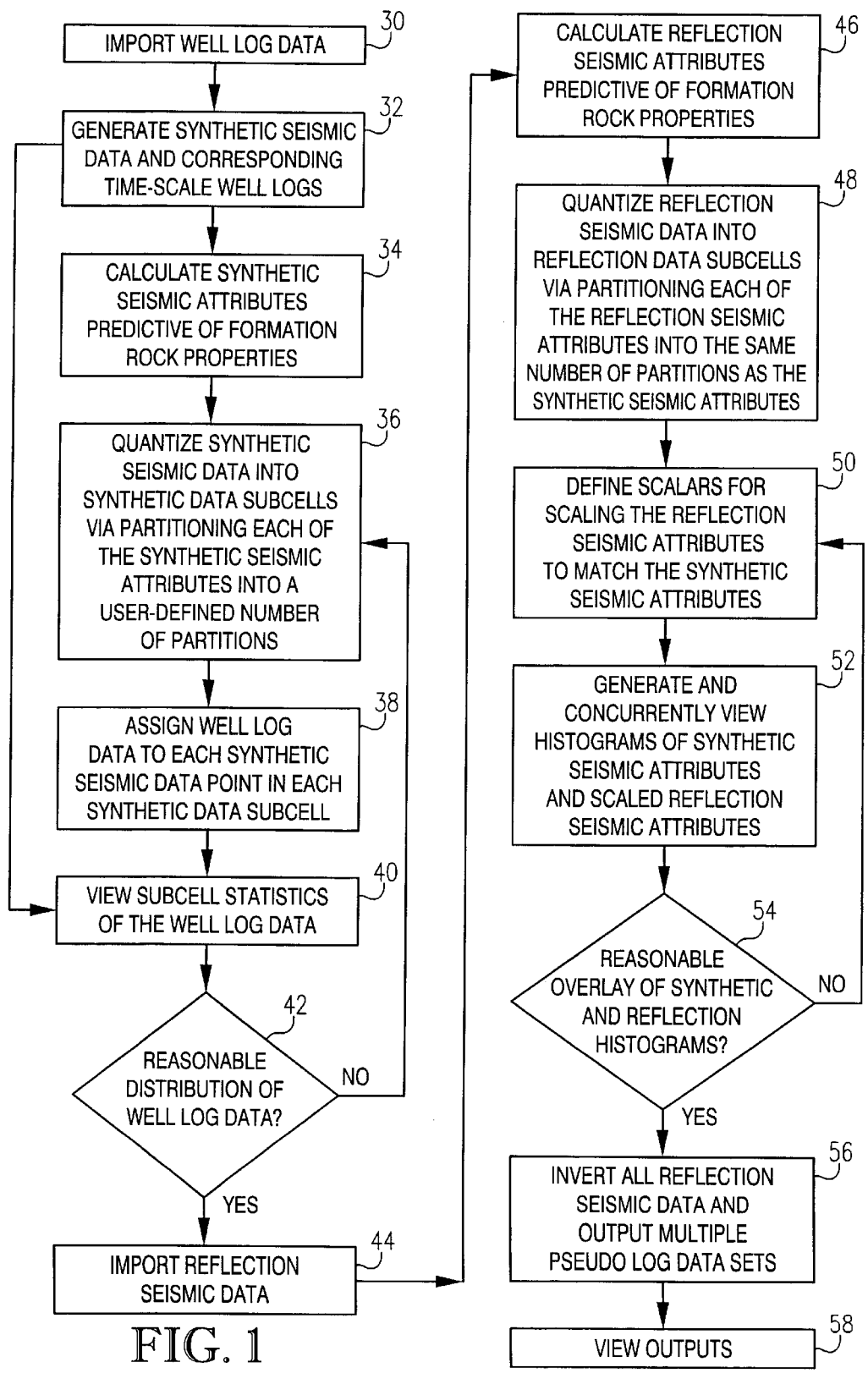
FIG. 1 is a computer flow chart outlining the steps for predicting rock properties of a subsurface formation by manipulating inputted well log data and reflection seismic data.

Referring initially to FIG. 1, the present invention involves a computer-implemented method for predicting rock properties of a subterranean formation by manipulating inputted well log data and reflection seismic data. Steps 30–58 in FIG. 1 outline the inventive computer-implemented seismic interpretation scheme. The steps of the inventive method described herein can be programmed and stored on a device readable by a standard personal computer or computer network. Suitable program storage devices include, for example, CD-ROMs, internal computer hard drives, and external network hard drives.

Figure 2:
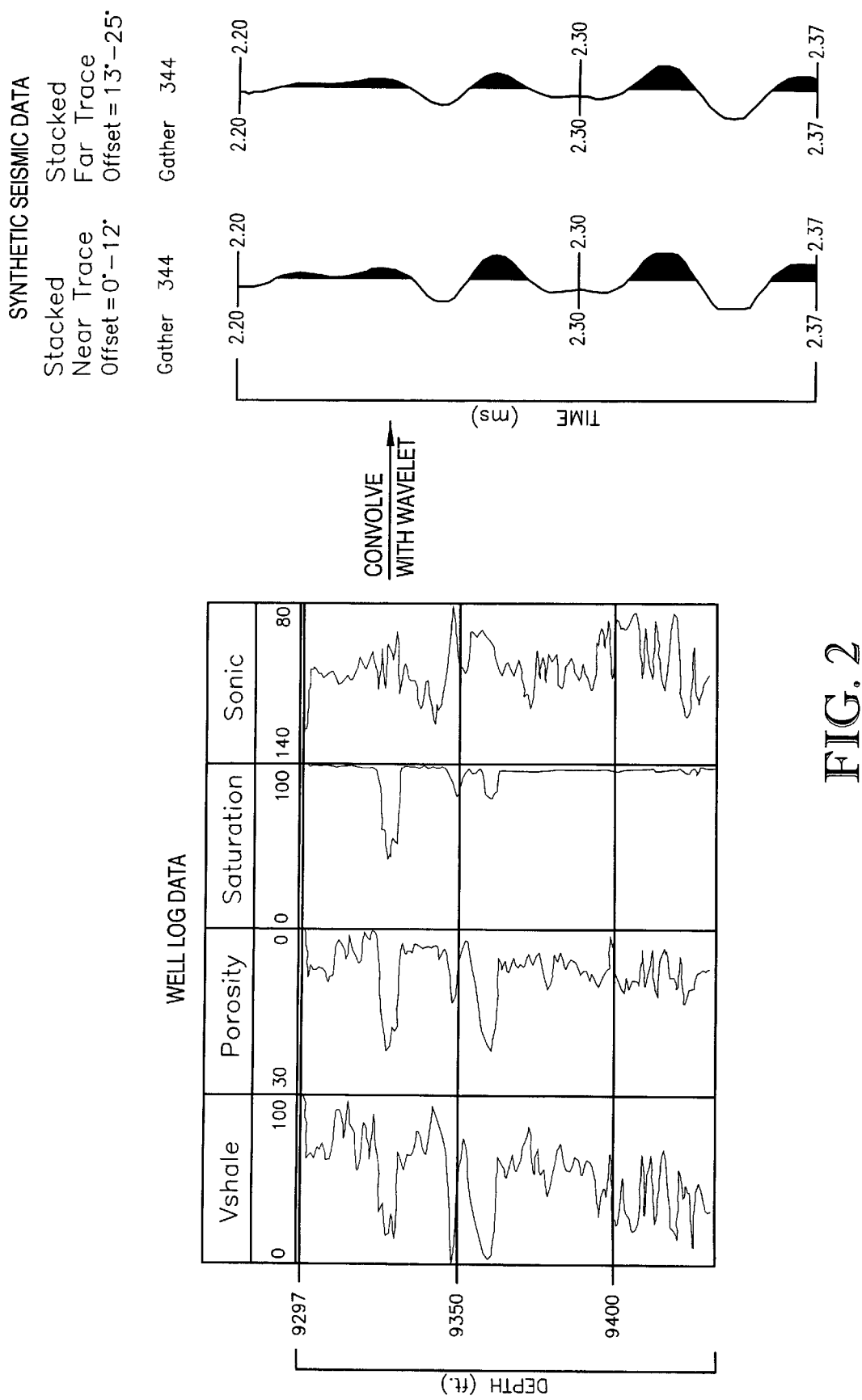
FIG. 2 is a graphical display of typical well log data that can be converted into synthetic seismic data.

In step 30 (FIG. 1), well log data is imported into computer memory for manipulation in accordance with the present invention. The well log data includes information relating to rock properties of a subterranean formation. The rock property information contained in the well log data may include depth-scale logs of hydrocarbon saturation ($S_w$), porosity ($\emptyset$), density ($\rho$), P-wave sonic ($V_p$), shear wave sonic ($V_S$), shaliness ($V_{SH}$), and pay zone. The well log data can be either actual well log data taken within a seismic surveyed volume (represented by reflection seismic data imported in step 44, described below) or hypothetical well log data estimating expected rock properties of the surveyed volume. A number of methods are known in the art for acquiring actual well log data or generating hypothetical well log data. In step 32, synthetic seismic data is generated from the well log data using known methods for creating synthetic seismograms. Typically, the generation of synthetic seismograms is accomplished by passing a wavelet extracted from the actual reflection seismic data through a reflection coefficient equation derived from the P-wave sonic, density, and shear sonic to get synthetic traces. Step 32 can also include generating time-scale logs for shaliness, saturation, porosity, and P-wave sonic that correspond to the synthetic time-scale traces. Details of wavelet processing for producing synthetic seismograms is disclosed in U.S. Pat. No. 5,487,001, the entire disclosure of which is incorporated herein by reference. FIG. 2 provides a graphical display of typical depth-scale well log data that can be converted into time-scale synthetic seismic data via convolution, or other known processes.

In step 34 (FIG. 1), synthetic seismic attributes are calculated from the synthetic seismic data generated in step 32. The synthetic seismic attributes calculated in step 34 are preferably attributes that are known to be predictive of formation rock properties and are readily determinable from conventional P-wave reflection seismic survey data. As discussed above in the background section, zero offset amplitude (A) and gradient (B) are known in AVO analysis to be predictive of rock properties. It has been discovered that other seismic attributes determinable from conventional seismic data can also be predictive of rock properties. One way to test whether or not a seismic attribute is predictive of rock properties is to view the effect of varying that seismic attribute on the shape of an amplitude versus gradient graph (i.e., A-B crossplot). If the position of the data on the A-B crossplot varies significantly as the value of the seismic attribute changes, that seismic attribute is predictive of rock properties. However, if the position of the data on the A-B crossplot does not vary significantly as the value of the seismic attribute changes, that seismic attribute is not predictive of rock properties.

Figure 3:
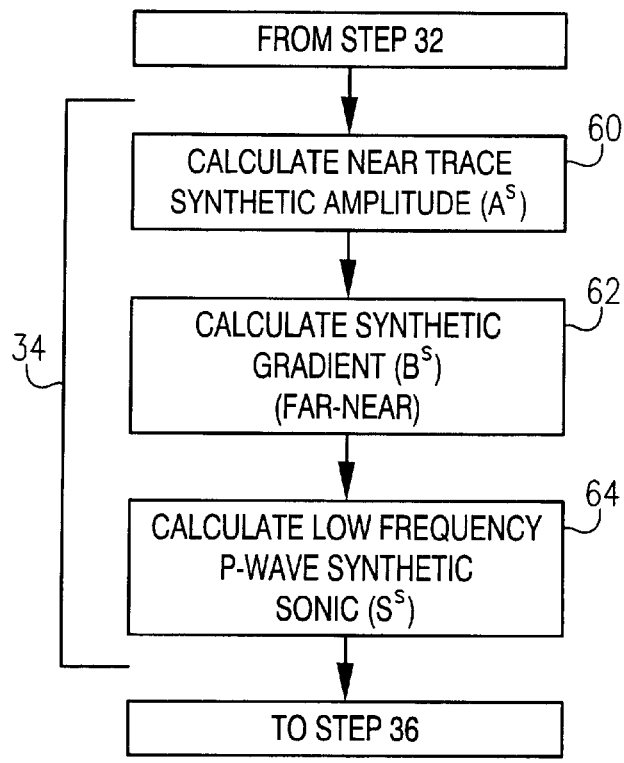
FIG. 3 is an expanded flow chart outlining substeps of synthetic seismic attribute calculation step 34 from FIG. 1, according to a first embodiment of the present invention.

The number of synthetic seismic attributes calculated in step 34 can vary; however, it is preferred for at least two but not more than eight synthetic attributes to be calculated. Referring to FIG. 3, in a first embodiment of the present invention, three synthetic seismic attributes are calculated in step 34: synthetic amplitude ($A^s$), synthetic gradient ($B^s$), and synthetic sonic ($S^s$). In substep 60, synthetic amplitude is calculated for a near (zero-offset) synthetic trace or a stacked group of near (e.g., 0–12 degree angle of incidence) synthetic traces. In substep 62, synthetic gradient is calculated by subtracting a near synthetic trace from a far synthetic trace, or by subtracting a stacked group of near (e.g., 0–12 degree angle of incidence) synthetic traces from a stacked group of far (e.g., 13–25 degree angle of incidence) synthetic traces. Alternatively, the synthetic gradient can be calculated using a least squares method accounting for all the synthetic traces from various angles of incidence. In substep 64, a low-frequency filter can then be applied to the sonic log calculated from the well log data. The particular low-frequency filter applied to the P-wave sonic log to generate the low-frequency synthetic sonic is preferably the same filter applied to the reflection seismic data in step 46

(FIG. 1), described below, so that the synthetic sonic can be meaningfully compared with the seismic-derived sonic or velocity (reciprocal sonic). The particular method of calculating synthetic amplitude, synthetic gradient, and synthetic sonic can vary greatly, so long as the resulting synthetic seismic attributes are relevant to predicting rock properties of the subsurface formation.

Figure 4:
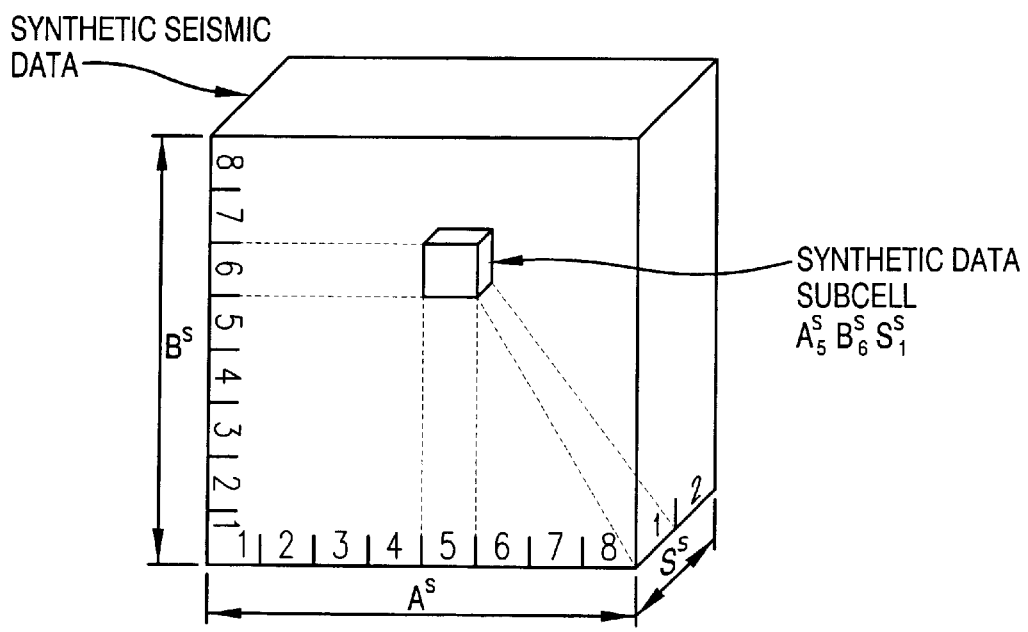
FIG. 4 is a visual illustration of the manner in which a set of synthetic seismic data can be quantized into a plurality of synthetic data subcells via partitioning of the synthetic seismic attributes.

In step 36 (FIG. 1), the synthetic seismic data generated in step 32 is quantized into a plurality of synthetic data subcells by partitioning the range of values for each synthetic seismic attribute into a user-defined number of attribute partitions. Referring to FIG. 4, when three synthetic seismic attributes (e.g., synthetic amplitude, gradient, and sonic) are calculated in step 34, the quantizing of the synthetic seismic data can easily be visualized as partitioning a three-dimensional cube of the synthetic seismic data into discrete three-dimensional synthetic data subcells. The synthetic seismic data cube illustrated in FIG. 4 has an x-axis defined by the range of synthetic amplitude values, a y-axis defined by the range of synthetic gradient values, and a z-axis defined by the range of synthetic sonic values. Although the quantizing of the synthetic seismic data is most easily visualized when three seismic attributes are calculated (as described in the first embodiment of the present invention), it should be understood that the synthetic data subcells can have more than three dimensions if more than three synthetic seismic attributes are calculated in step 34. For example, five-dimensional synthetic data subcells defined by five synthetic seismic attributes (i.e., synthetic amplitude, gradient, sonic, isochron, and phase angle) will be described below in a second embodiment of the present invention.

The number of attribute partitions used to quantize the synthetic seismic data should be chosen by the user so as to result in synthetic data subcells having statistically significant distributions of well log data located therein. Although not all synthetic data subcells will contain synthetic seismic data points, it is preferred for a substantial number of the synthetic data subcells which do include synthetic seismic data points to contain a statistically significant distribution of the synthetic seismic data points. Preferably, at least fifty percent of the synthetic data subcells that contain synthetic seismic data contain between 5 and 1,000 data points. Most preferably, at least seventy-five percent of the synthetic data subcells that contain synthetic seismic data contain between 10 and 100 data points. Generally, the number of attribute partitions for synthetic amplitude and synthetic gradient will be much greater than the number of attribute partitions for other synthetic seismic attribute(s) (e.g., synthetic sonic) because amplitude and gradient are significantly more predictive of subsurface rock properties than other seismic attributes. For ease of illustration, FIG. 4 shows eight synthetic amplitude ($A^S$) partitions, eight synthetic gradient ($B^S$) partitions, and two synthetic sonic ($S^S$) partitions. However, a more typical number of attribute partitions would be 25–100 amplitude partitions, 25–100 gradient partitions, and 2–5 sonic partitions. Referring again to FIG. 4, each synthetic data subcell can be identified by attribute partition numbers. For example, synthetic data subcell $A_5^S B_6^S S_1^S$ is identified by the fifth synthetic amplitude partition, the sixth synthetic gradient partition, and the first synthetic sonic partition.

Figure 5:
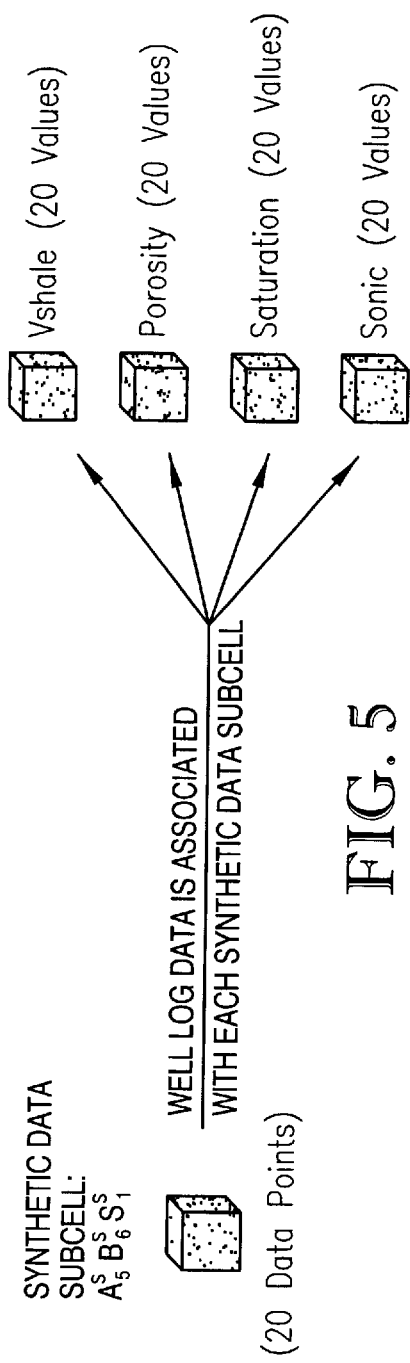
FIG. 5 is a visual illustration of the fact that each synthetic data subcell includes a number of data points that each have well log properties associated therewith.
Figure 6:
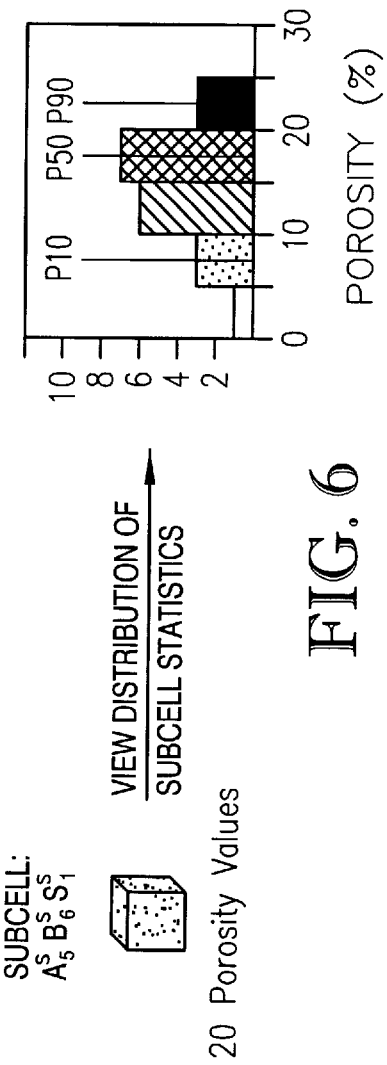
FIG. 6 is a visual illustration that each synthetic data subcell includes a statistical distribution of well log properties (e.g., porosity) that can be viewed as a histogram for that particular synthetic data subcell.

In step 38 (FIG. 1), time-scale well log data from step 32 is assigned to each synthetic seismic data point in each synthetic data subcell. The well log data assigned to each synthetic seismic data point in each synthetic data subcell preferably includes rock properties such as porosity, saturation, shaliness, density, and P-wave sonic. Thus, each synthetic data subcell will have a statistical distribution of each rock property associated therewith. Referring to FIG. 5, a graphical illustration is provided to show that synthetic data subcell $A_5^S B_6^S S_1^S$, having 20 data points located therein, will have 20 values for each rock property associated with that synthetic data subcell. FIG. 6 provides a graphical illustration showing that each synthetic data subcell (e.g., subcell $A_5^S B_6^S S_1^S$) contains a statistical distribution of each rock property (e.g., porosity) that can be viewed as a histogram for that synthetic data subcell. The vertical lines labeled P10, P50, and P90 in the porosity histogram of FIG. 6 identify porosity values consistent with given statistical probabilities. For example, in FIG. 6, the P10 porosity value is 7.5%, the P50 porosity value is 17.5%, and the P90 porosity value is 22.5%. The P10 porosity value is an indication that there is a ten percent chance that the porosity value of a data point landing in synthetic data subcell $A_5^S B_6^S S_1^S$ will be less than 7.5%. Similarly, the P50 and P90 porosity values indicate that there is a fifty percent chance that the porosity value of a data point in synthetic data subcell $A_5^S B_6^S S_1^S$ will be less than 17.5% and a ninety percent chance that the porosity value will be less than 22.5%.

Figure 7A:
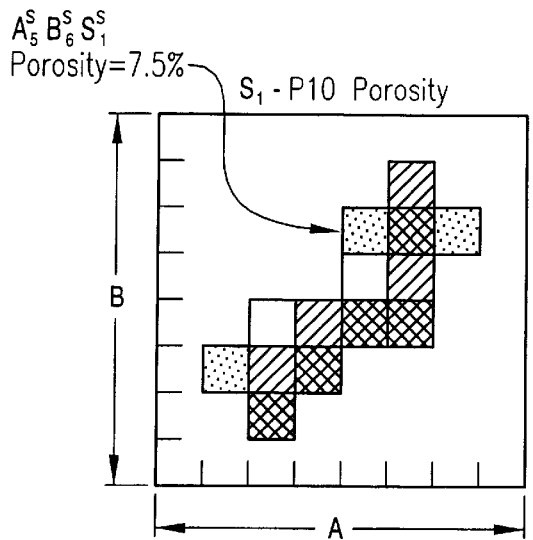
FIG. 7a is an amplitude versus gradient plot (i.e., A-B crossplot) showing the P10 statistical porosity values for the synthetic seismic subcells of the first sonic partition.
Figure 7B:
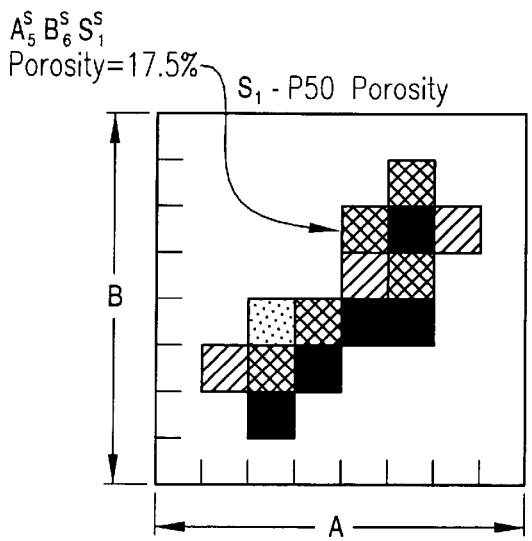
FIG. 7b is an A-B crossplot showing the P50 statistical porosity values for the synthetic data subcells of the first sonic partition.
Figure 7C:
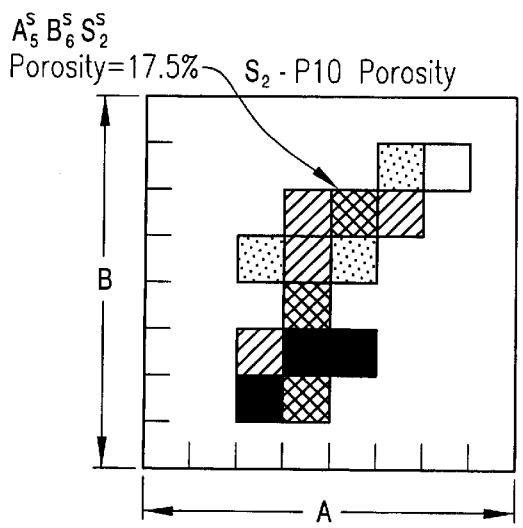
FIG. 7c is an A-B crossplot showing the P10 statistical porosity values for the synthetic data subcells of the second sonic partition.
Figure 7D:
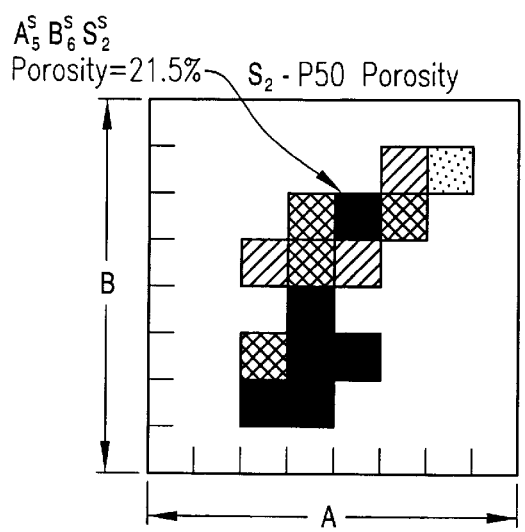
FIG. 7d is an A-B crossplot showing the P50 statistical porosity values for the synthetic data subcells of the second sonic partition.

FIGS. 7*a–d* provide a graphical illustration showing that the A-B crossplot of all the synthetic seismic data is unique for each sonic partition and each set of statistics viewed. In particular, FIG. 7*a* shows an A-B crossplot for the first sonic partition using P10 porosity values. It can be seen that each synthetic data subcell in the A-B crossplot is assigned a single rock property value based on which statistics (e.g., P10, P50, or P90) are chosen for viewing. For example, in FIG. 7*a* it can be seen that the P10 porosity value assigned to synthetic data subcell $A_5^S B_6^S S_1^S$ is the P10 porosity value (7.5%) from the porosity histogram of synthetic data subcell $A_5^S B_6^S S_1^S$ shown in FIG. 6. In FIG. 7*b* it can be seen that the P50 porosity value assigned to synthetic data subcell $A_5^S B_6^S S_1^S$ is the P50 porosity value (17.5%) from the porosity histogram of synthetic data subcell $A_5^S B_6^S S_1^S$ shown in FIG. 6. FIG. 7 also shows that the shape of the A-B crossplot varies for each sonic partition number. Thus, the P10 porosity value for second sonic partition subcell $A_5^S B_6^S S_2^S$ (FIG. 7*c*) will likely be different than the P10 porosity value for first sonic partition subcell $A_5^S B_6^S S_1^S$ (FIG. 7*a*). Likewise, the P50 porosity value for second sonic partition subcell $A_5^S B_6^S S_2^S$ (FIG. 7*d*) will likely be different than the P50 porosity value for first sonic partition subcell $A_5^S B_6^S S_1^S$ (FIG. 7*b*). FIG. 7, therefore, shows that each synthetic data subcell can be assigned one value for each rock property (e.g., porosity, saturation, density, sonic, or shaliness) based on the individual set of statistics (e.g., P10, P50, or P90) chosen for viewing.

In step 40 (FIG. 1), the statistical distribution of well log data for a plurality of synthetic data subcells is viewed to check for statistical significance. One way of viewing the statistical distribution of well log data for each subcell is to view a histogram (as shown in FIG. 6) of the rock property data for individual subcells. Another way to view the statistical distribution of well log data for each subcell is to view the change in shape of A-B crossplots for different synthetic seismic attributes (e.g., sonic partition number one versus sonic partition number two). If the shape of the A-B crossplots is not significantly altered between sequential seismic attribute partitions, the number of partitions for that seismic attribute may be too great. In step 42 (FIG. 1), the user decides whether the number of partitions defined in step 36 provided synthetic data subcells containing a reasonable (i.e., statistically significant) distribution of well log data. If the distribution of well log data for the synthetic data subcells does not appear to be optimum, the program can return to step 36 and the user can change the number of partitions for one or more of the synthetic seismic attributes. Thus, the process of quantizing the reflection seismic data into statistically significant synthetic data subcells is truly an iterative process that is data-dependent.

Once the distribution of well log data in the synthetic data subcells appears reasonable, the program continues to step 44 (FIG. 1), where reflection seismic data is imported for computer manipulation. The reflection seismic data imported in step 44 is typically in the form of a spatial sequence of seismic time scale traces, which have been recorded, stacked, and properly migrated over a restricted time window as known in the art.

Figure 8:
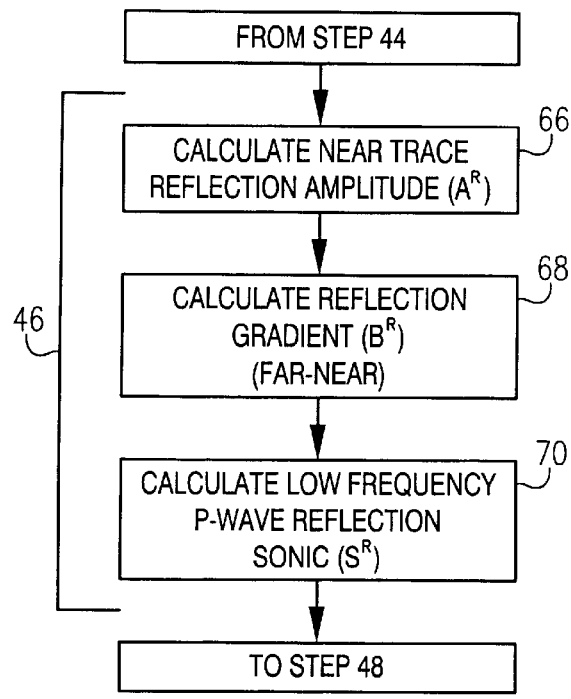
FIG. 8 is an expanded flow chart outlining substeps of reflection seismic attribute calculation step 46 from FIG. 1, according to the first embodiment of the present invention.

In step 46 (FIG. 1), reflection seismic attributes are calculated from the reflection seismic data imported in step 44. The reflection seismic attributes calculated in step 46 are preferably the same type of seismic attributes calculated for the synthetic seismic data in step 34. Referring to FIG. 8, in the first embodiment of the present invention, three reflection seismic attributes are calculated in step 46, including reflection amplitude ($A^R$), reflection gradient ($B^R$), and seismic-derived sonic ($S^R$). The reflection amplitude, gradient, and sonic calculated in substeps 66,68,70 can be calculated by any method known in the art. Preferably, the reflection amplitude, gradient, and sonic calculated in substeps 66,68,70 are calculated in substantially the same manner as synthetic amplitude, gradient, and sonic were calculated in substeps 60,62,64 (shown in FIG. 3), thereby yielding comparable results. Generally, seismic-derived sonic (i.e., reciprocal P-wave velocity) can be determined from a normal move out (NMO) velocity analysis or other seismic interval velocity estimation schemes and then filtered with a low-frequency filter.

Figure 9:
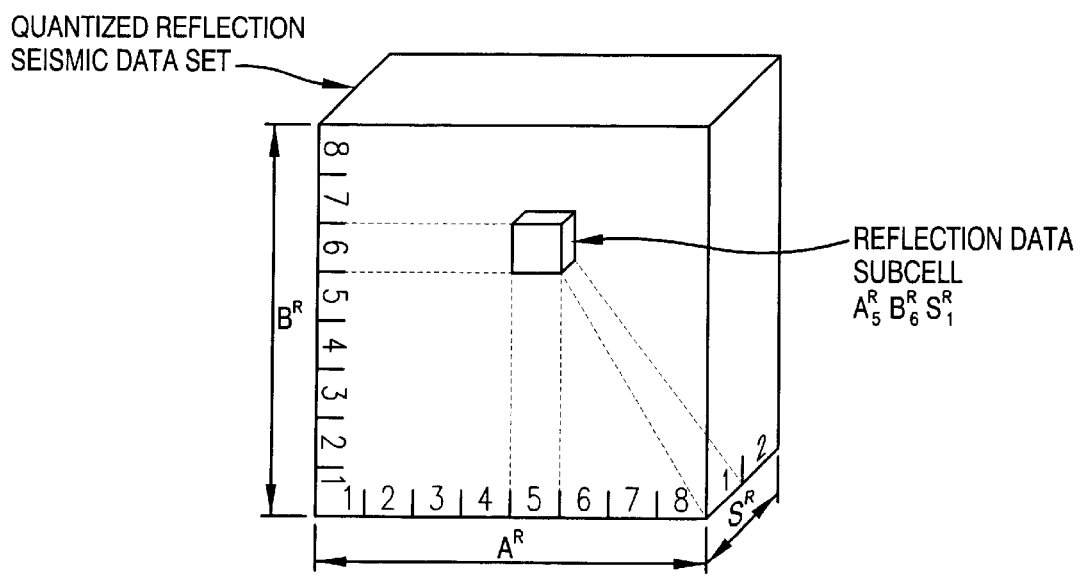
FIG. 9 is a visual illustration of the manner in which a reflection seismic data set can be quantized into a plurality of reflection data subcells via partitioning of the reflection seismic attributes.

In step 48 (FIG. 1), the reflection seismic data generated in step 46 is quantized into a plurality of reflection data subcells by partitioning the range of values for each reflection seismic attribute into the same number of attribute partitions as were used to quantize the synthetic seismic data in step 36. Referring to FIG. 9, when three reflection seismic attributes (e.g., reflection amplitude, gradient, and sonic) are calculated in step 46, the quantizing of the reflection seismic data set can be visualized as partitioning a three-dimensional cube of the reflection seismic data into three-dimensional reflection data subcells. The illustrated reflection seismic data cube has an x-axis defined by the range of reflection amplitude values, a y-axis defined by the range of reflection gradient values, and a z-axis defined by the range of reflection sonic values. As mentioned above, the number of partitions for each reflection seismic attribute should be the same as the number of partitions for the corresponding synthetic seismic attribute. Thus, each reflection data subcell corresponds to a synthetic data subcell as defined by its location in multi-dimensional quantized space. For example, reflection data subcell $A_5^R B_6^R S_1^R$ (shown in FIG. 9) corresponds to synthetic data subcell $A_5^R B_6^R S_1^S$ (shown in FIG. 4).

In step 50 (FIG. 1), unitless scalars are defined for scaling the range of values of reflection seismic attributes to approximately match the range of values for corresponding synthetic seismic attributes. In many instances the range of values for a synthetic seismic attribute (e.g., synthetic gradient) calculated in step 34 will be significantly different from the range of values for a reflection seismic attribute (e.g., reflection gradient) calculated in step 46. For example, the range of calculated synthetic gradient values may vary from −300 to 300, while the range of calculated reflection gradient values may vary from −600 to 600. In such a case, it may be appropriate to define a 0.5 gradient scalar value to be applied to the calculated reflection gradient values to thereby reduce the −600 to 600 range of reflection gradient values to a −300 to 300 range of reflection gradient values. The scaling of the reflection and synthetic seismic attributes provides a more appropriate match between the data in reflection and synthetic data subcells.

Figures 10A, 10B:
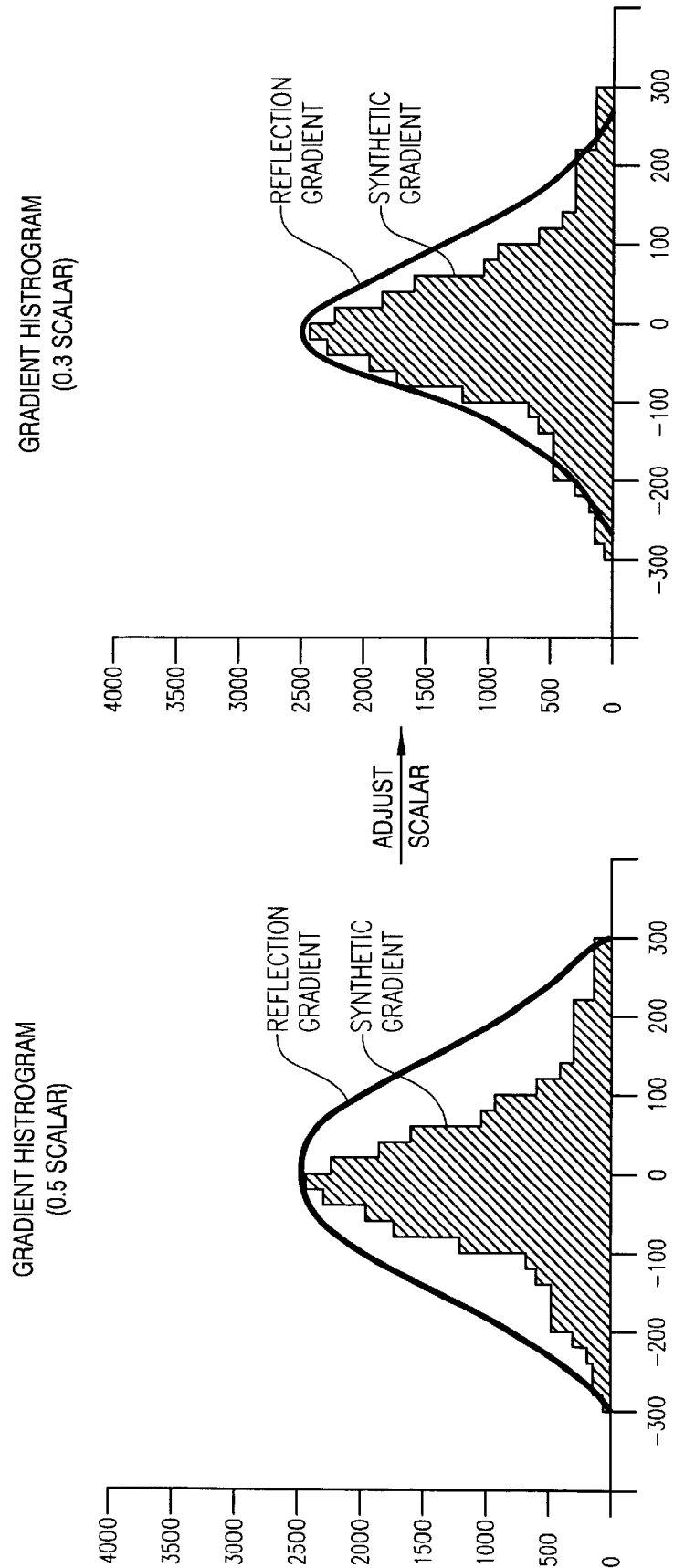
FIG. 10a is an illustration of a gradient histogram comparing the synthetic and reflection gradients, particularly illustrating the match between the synthetic and reflection gradients when a gradient scalar of 0.5 is applied to the reflection gradient.
FIG. 10b is an illustration of the comparative gradient histogram employing a gradient scalar of 0.3, particularly illustrating the manner in which the histograms for the reflection gradient and the synthetic gradient can be more accurately matched to one another by adjusting the gradient scalar.
Figure 11:
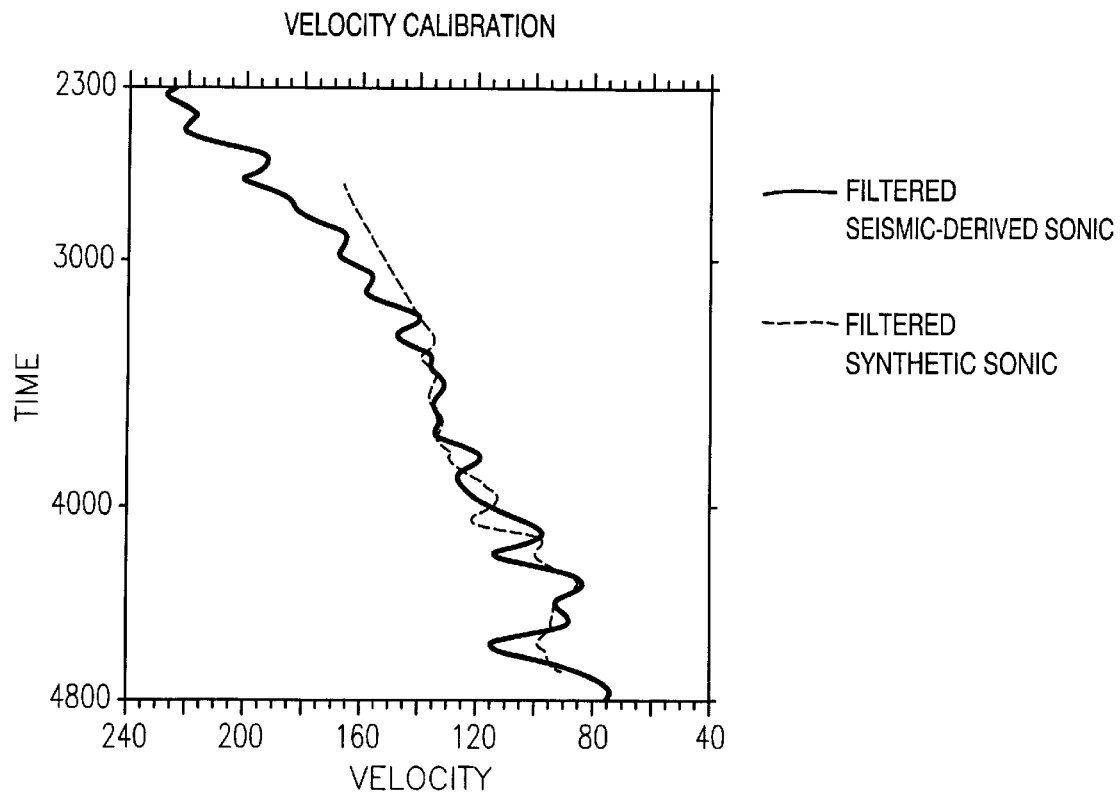
FIG. 11 is a velocity calibration graph showing that the velocity scalar can be adjusted in order to match a plot of the filtered seismic-derived sonic with a plot of the filtered synthetic sonic.

In step 52 (FIG. 1), histograms of the synthetic seismic attributes and scaled reflection seismic attributes are generated and concurrently viewed. FIG. 10a shows a graphical display of concurrently viewed reflection and synthetic gradient histograms, with a 0.5 scalar being applied to the reflection gradient values. It can be seen in FIG. 10a that the curve for the reflection gradient values seems to be wider than the bars of the synthetic gradient values. In order to more accurately match the reflection and synthetic gradients, the gradient scalar can be adjusted and reapplied to the reflection gradient values. FIG. 10b shows the concurrently viewed reflection and synthetic gradient histograms with a 0.3 scalar being applied to the reflection gradient values. It can be seen that the reflection and synthetic gradient histogram curves more closely match one another when a gradient scalar of 0.3 is applied (shown in FIG. 10b) rather than a gradient scalar of 0.5 (shown in FIG. 10a). Similarly, FIG. 11 shows that a plot of filtered seismic-derived sonic values and filtered synthetic sonic values can be concurrently viewed in order to determine whether the appropriate sonic scalar has been employed. This step of concurrently viewing histograms/graphs of the synthetic and scaled reflection seismic attributes can be performed for all of the seismic attributes, thereby allowing appropriate scalars to be selected.

In step 54 (FIG. 1), the user decides whether or not the overlay of the synthetic and scaled reflection attribute histograms/graphs is reasonable. If the overlay of the histograms/graphs is not reasonable, the program can return to step 50 and the user can define a different scalar value for one or more of the seismic attributes. If the overlay is reasonable, the program can continue to step 56. Thus, the selection of appropriate scalars is truly an iterative process that is data-dependent.

Figure 12:
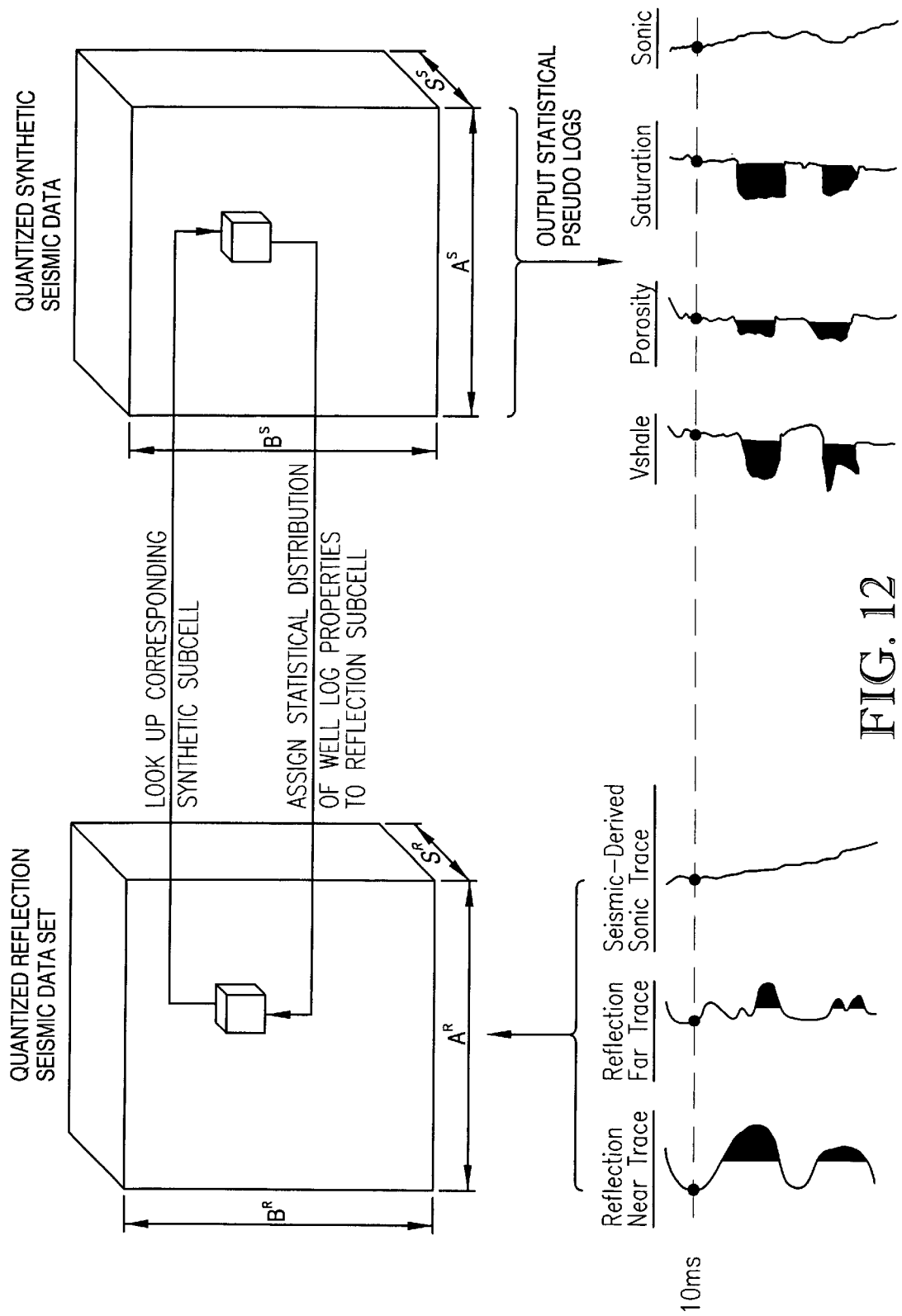
FIG. 12 is a visual illustration of the inversion process, showing that the inversion process is simply a lookup scheme wherein a statistical distribution of well log properties from a synthetic data subcell is applied to a corresponding reflection data subcell to provide statistical pseudo logs for the inverted reflection seismic data.

In step 56 (FIG. 1), the reflection seismic data is inverted to produce multiple pseudo log data sets. FIG. 12 is a graphical illustration of the inversion process. As illustrated in FIG. 12, the inversion process is simply a look-up scheme wherein a reflection seismic data point is first identified with a reflection data subcell according to its location in quantized spaced as defined by its seismic attribute values, the synthetic data subcell corresponding with that reflection data subcell is then identified, the statistical distribution of well log data associated with the identified synthetic data subcell is then applied to the original reflection seismic data point, and a statistical pseudo log data point for the original reflection seismic data point is outputted. The dashed line labeled "10 ms" in FIG. 12 illustrates that each data point in the outputted pseudo logs (e.g., Vshale, porosity, saturation, and sonic) corresponds to a data point in the reflection seismic data (e.g., near reflection trace, far reflection trace, and seismic-derived sonic).

Figure 13:
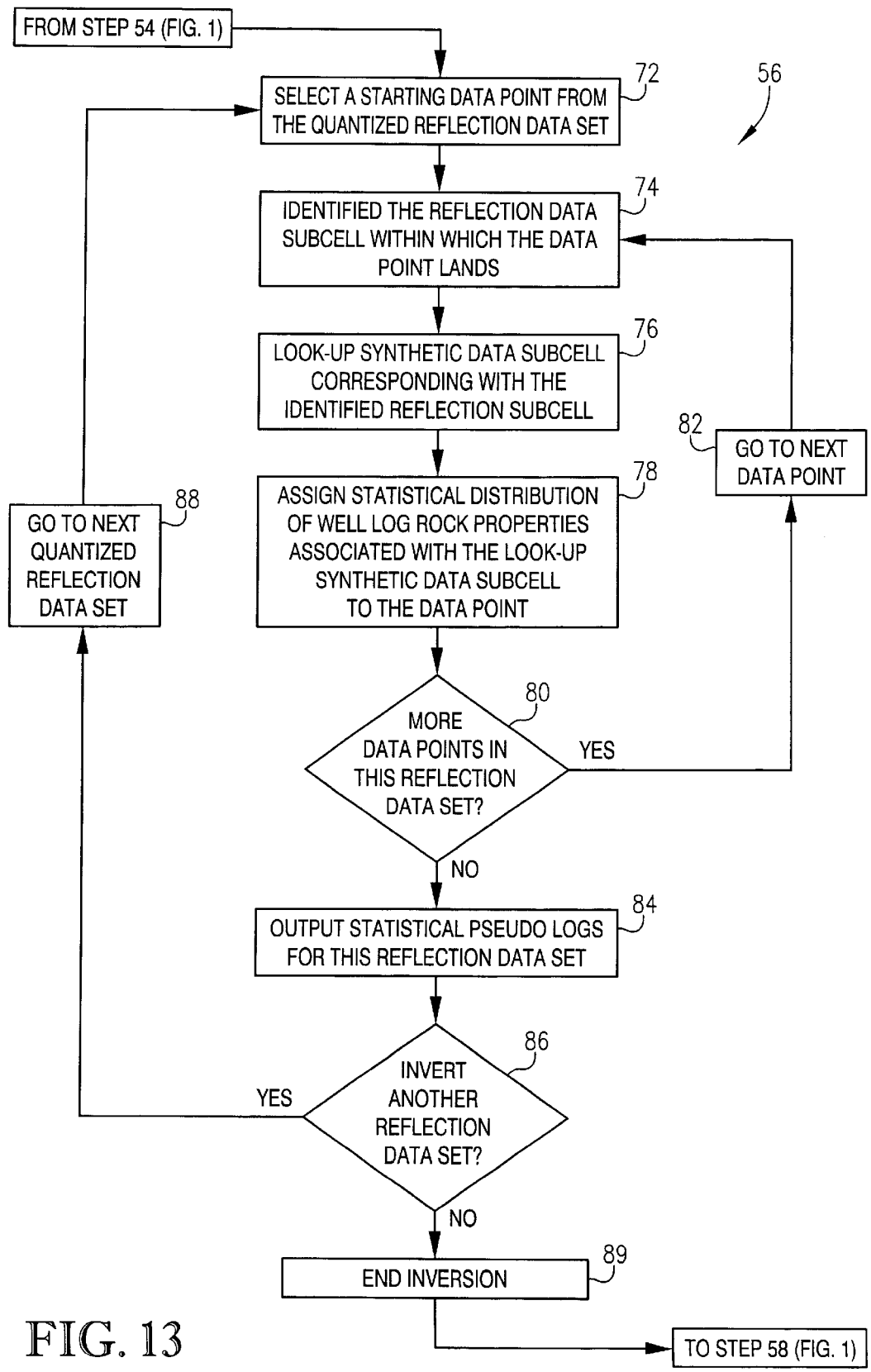
FIG. 13 is an expanded flow chart outlining substeps of inversion step 56 from FIG. 1.

FIG. 13 outlines the substeps involved in inversion step 56 (FIG. 1). In substep 72, a starting data point from the quantized reflection seismic data set is selected. In substep 74, the reflection data subcell within which the reflection seismic data point lands is identified by the seismic attribute values for that data point. In substep 76, the synthetic data subcell corresponding to the reflection data subcell identified in step 74 is identified. In step 78, the statistical distribution of well log properties associated with the synthetic data subcell identified in step 76 is assigned to the reflection seismic data point. In step 80, the computer determines whether or not any more reflection seismic data points are available for inversion. If more reflection seismic data points need to be inverted, the computer selects the next sequential reflection seismic data point in step 82. Steps 74, 76, 78, and 80 are then repeated until each of the reflection seismic data points in the quantized reflection seismic data set has been inverted. After all data points in the reflection seismic data set have been inverted, statistical pseudo logs for the reflection seismic data set can be written to an output file. The computer then asks whether another reflection seismic data set needs to be inverted. If another reflection seismic data set is available for inversion, the computer imports the next seismic reflection data set in step 88. Steps 72–86 can then be repeated for however many reflection seismic data sets need to be inverted. After inversion of all the reflection seismic data sets, the inversion process is terminated in step 89. Referring to FIG. 1, the statistical results from inversion step 56 can be viewed as 2D seismic lines, 3D seismic volumes, or single data point histograms in step 58 using a conventional seismic viewing tool.

Figure 14:
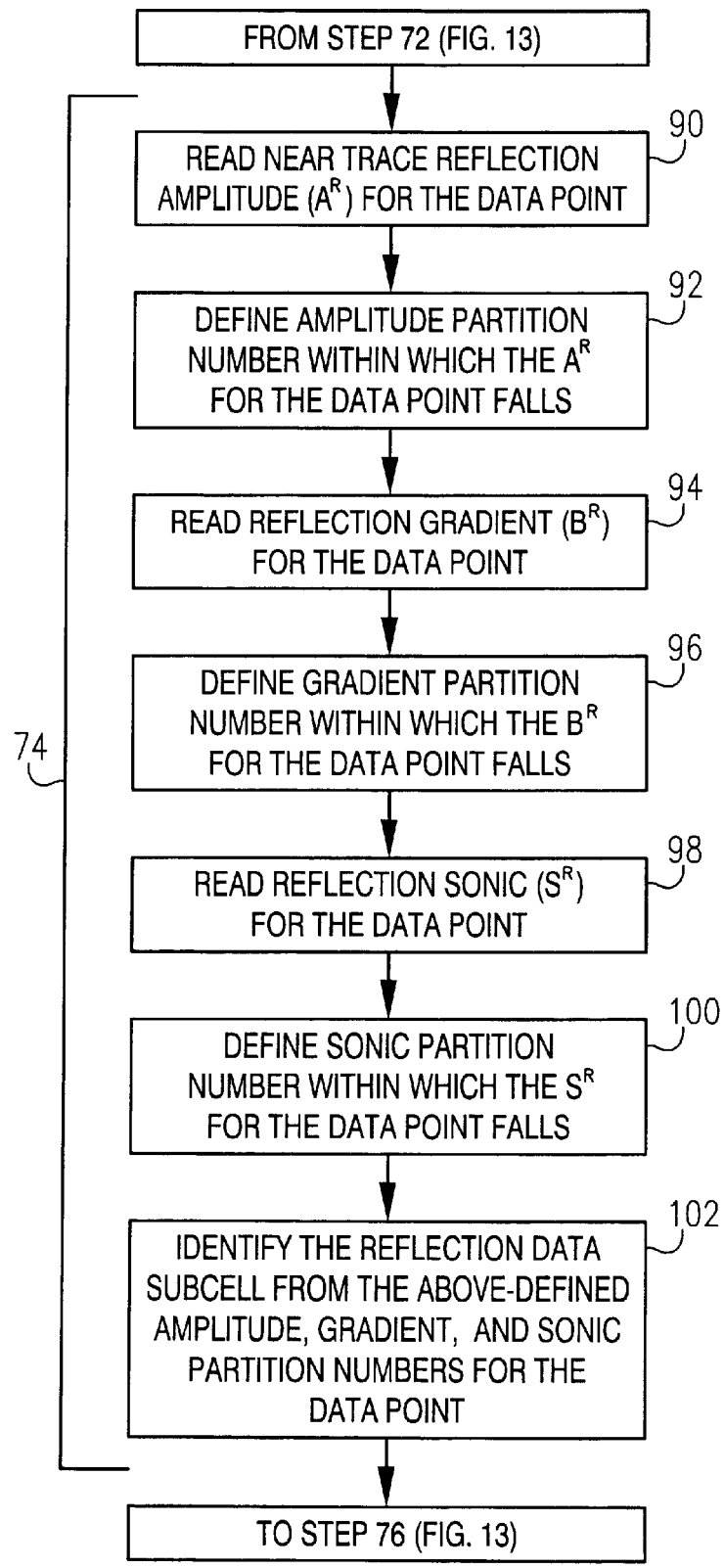
FIG. 14 is an expanded flow chart outlining substeps of subcell identification substep 74 from FIG. 13, according to the first embodiment of the present invention.

Referring to FIG. 14, the substeps of reflection data subcell identification substep 74 (FIG. 13) are outlined in detail. In substep 90, the reflection amplitude value of the reflection seismic data point is read. In substep 92, the reflection amplitude partition number within which the reflection amplitude value calculated in step 90 falls is defined. In step 94, the reflection gradient value for the reflection seismic data point is read. In step 96, the reflection gradient partition number within which the reflection gradient value determined in step 94 falls is defined. In substep 98, the reflection sonic value of the reflection seismic data point is read. In substep 100, the reflection sonic partition number within which the reflection sonic value determined in substep 98 falls is defined. In substep 102, the reflection data subcell represented by the reflection amplitude, gradient, and sonic partition numbers defined in substeps 92, 96, and 100 is identified.

Figure 16:
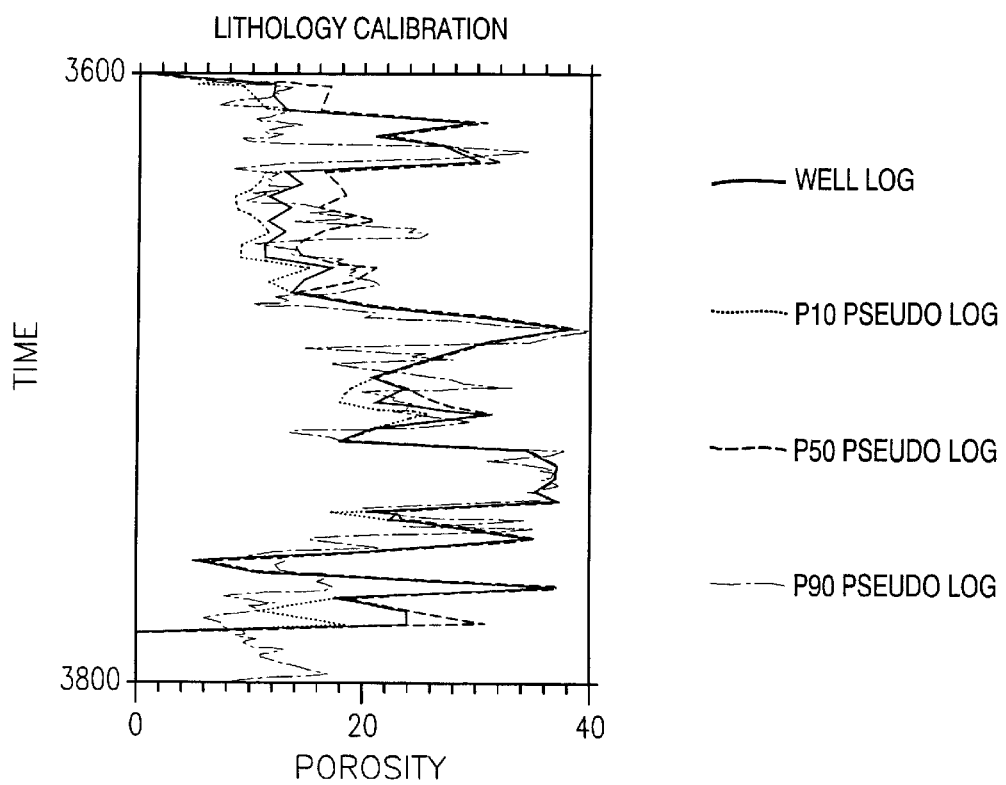
FIG. 16 is a graph comparing the actual well log porosity with the statistical pseudo log porosities generated using the lithology calibration steps outlined in FIG. 15.
Figure 15:
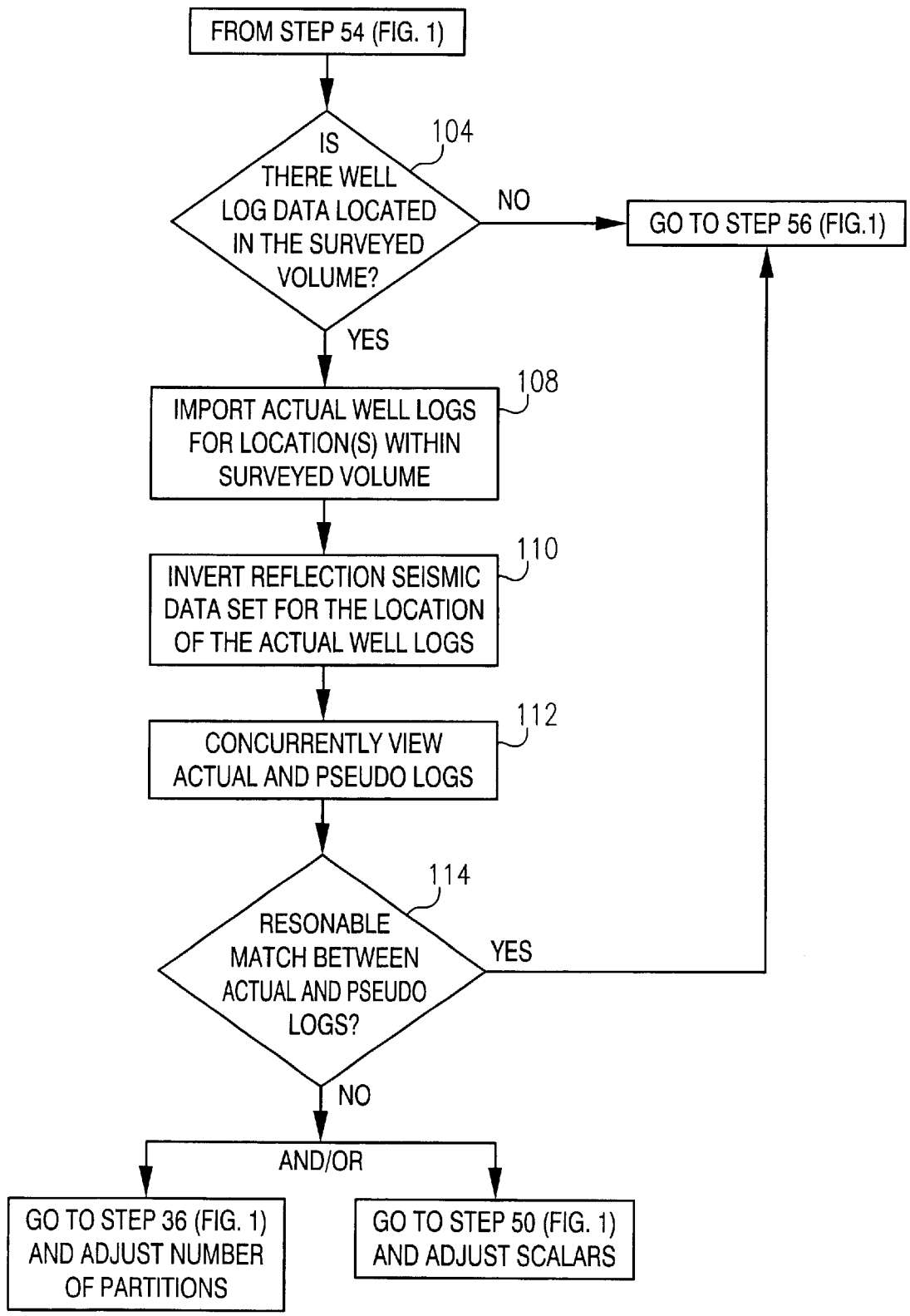
FIG. 15 is a flow chart setting forth the steps involved in calibrating the number of attribute partitions and the value of the attribute scalars based upon actual well log data for locations within the surveyed volume.

Referring to FIG. 15, steps 104–114 outline an optional lithology calibration method that uses actual well log data taken within the subsurface volume represented by the reflection seismic data to check the appropriateness of the number of attribute partitions and the value of the seismic attribute scalars. If the well log data imported in step 30 (FIG. 1) is hypothetical well log data that is either synthetically generated or taken from a location outside the location represented by the reflection seismic data of step 44 (FIG. 1), further calibration of the attribute partitions and attribute scalars may be advisable when actual well log data is available within the subsurface volume represented by the reflection seismic data. The lithology calibration method outlined in FIG. 15 can take place between steps 54 and 56 (shown in FIG. 1). In step 104 (FIG. 15), the program asks whether or not there is actual well log data located within the subsurface surveyed volume represented by the reflection seismic data. If no well log data is available, the program skips to inversion step 56 (FIG. 1). If actual well log data is available in the surveyed volume, such actual well log data is imported in step 108. In step 110, a set of the reflection seismic data corresponding to the location of the actual well log data imported in step 108 is inverted using the steps previously described with reference to FIGS. 13 and 14. The outputted pseudo logs for the reflection seismic data set inverted in step 110 can then be concurrently viewed with the actual well logs imported in step 108. FIG. 16 shows an example of the manner in which actual and pseudo porosity logs can be concurrently viewed in order to check the calibration of the attribute partitions defined in step 36 (FIG. 1) and the attribute scalars defined in step 50 (FIG. 1). The concurrent viewing of the actual and pseudo logs is preferably performed for all the rock properties, not just porosity. Referring again to FIG. 15, in step 114, the program asks whether the match between the actual and pseudo logs is reasonable. If the match between the actual and pseudo logs is reasonable, the program progresses to inversion step 56 (FIG. 1). If the match between the actual and pseudo logs generated in step 112 is not reasonable, the user can either return to step 36 (FIG. 1) and adjust the number of attribute partitions or return to step 50 (FIG. 1) and adjust the attribute scalars.

In accordance with a second embodiment of the present invention, the computer implemented method outlined in FIGS. 1 and 13 can be employed to determine rock properties of a subsurface formation using the following five seismic attributes: amplitude, gradient, sonic, isochron, and phase angle. These five seismic attributes are known to be predictive of formation rock properties and are readily determinable from conventional P-wave reflection seismic survey data. The method of the second embodiment of the present invention is similar to the method described in the first embodiment of the present invention; however, additional steps are necessary to calculate and manipulate the two additional seismic attributes of isochron and phase angle.

Figures 17, 18:
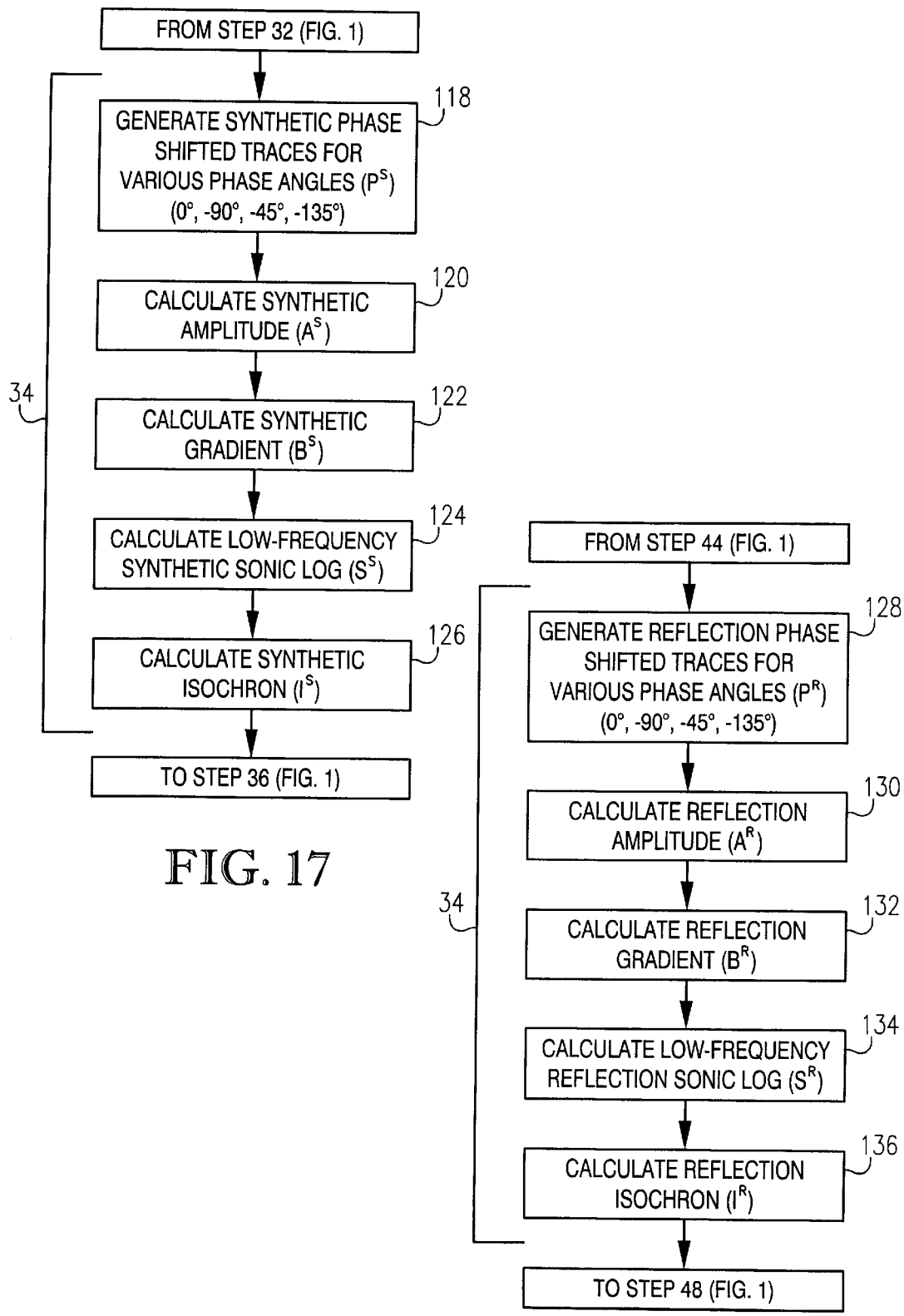
FIG. 17 is an expanded flow chart outlining substeps of synthetic seismic attribute calculation step 34 from FIG. 1, according to a second embodiment of the present invention.
FIG. 18 is an expanded flow chart outlining substeps of reflection seismic attribute calculation step 46 from FIG. 1, according to the second embodiment of the present invention.

Referring to FIG. 1, when practicing the second embodiment of the present invention, steps 30 and 32 are substantially identical to the first embodiment of the present invention. In step 34, however, the two additional synthetic seismic attributes of phase angle and isochron must be accounted for. FIG. 17 outlines the substeps of synthetic seismic attribute calculation step 34 (FIG. 1) for the second embodiment of the present invention. In step 118, the program generates synthetic phase shifted traces for different phase angles ($P^S$). It is preferred for the 0°, –90°, –45°, and –135° synthetic phase shifted traces to be generated in substep 118. Alternatively, only the 0° and –90° phase traces can be generated in substep 118. In substep 120, the synthetic amplitude ($A^S$) is determined for each of the synthetic phase angles. In step 122, the synthetic gradient ($B^S$) is calculated for each of the synthetic phase angles. In step 124, the low-frequency synthetic sonic ($S^S$) is calculated for each of the synthetic phase angles. In substep 126, the synthetic isochron ($I^S$) is calculated for each synthetic phase angle. As is known in the art, isochron refers to the time separation from the peak to the trough of a seismic trace. Each data point located between the peak and the trough of a trace is assigned the same isochron value corresponding to the time separation between that peak and trough.

In step 36 (FIG. 1), the synthetic seismic data generated in step 32 is quantized into a plurality of five-dimensional synthetic data subcells by partitioning the range of values for each synthetic seismic attribute ($A^S$, $B^S$, $I^S$, $S^S$, $P^S$) into a user-defined number of attribute partitions. As described above, the number of attribute partitions used to quantize the synthetic seismic data should be chosen by the user to result in synthetic data subcells having statistically significant distributions of well log data associated therewith. Generally, the number of attribute partitions for synthetic amplitude and synthetic gradient will be much greater than the number of partitions for synthetic sonic and synthetic isochron. The number of partitions for synthetic phase angle will automatically equal the number of phase angles calculated in substep 118 (FIG. 17). Typically, the number of attribute partitions will be 25–100 synthetic amplitude partitions, 25–100 synthetic gradient partitions, 2–5 synthetic isochron partitions, 2–5 synthetic sonic partitions, and 2–6 synthetic phase angle partitions.

Steps 38–44 (FIG. 1) can then be carried out in a manner similar to the manner described above with reference to the first embodiment of the present invention. In step 46, however, the additional reflection seismic attributes of phase angle and isochron must be calculated. FIG. 18 shows the substeps involved in reflection seismic attribute calculation step 46 (FIG. 1). In step 128, phase shifted traces for various reflection phase angles ($P^R$) are calculated. Preferably, the same reflection phase angles are calculated in substep 128 as were calculated for synthetic phase angles in substep 118. In substep 130, reflection amplitude ($A^R$) is calculated for each reflection phase angle. In substep 132, reflection gradient ($B^R$) is calculated for each reflection phase angle. In substep 134, low-frequency seismic-derived sonic ($S^R$) is calculated. In substep 136, reflection isochron ($I^R$) is calculated for each reflection phase angle.

Referring to FIG. 1, after step 48 is performed in accordance with the second embodiment of the present invention, steps 50–54 can be performed in a manner similar to that described with reference to the first embodiment of the present invention. However, inversion step 56 is performed differently in the second embodiment of the present invention than in the first embodiment of the present invention. FIG. 19 outlines the substeps involved in inversion step 56 (FIG. 1), carried out in accordance with the second embodiment of the present invention. In substep 138 (FIG. 19), the zero phase angle data set is imported. In substep 140, the reflection amplitude of the reflection seismic data point is read. In substep 142, the program asks whether the reflection amplitude value determined in substep 140 is near the zero crossing of the amplitude wavelet. The criteria used to determine whether or not the reflection seismic data point is near the zero amplitude crossing is data-dependent. However, typically, if the absolute value of the reflection amplitude calculated in substep 140 is less than about 50% of the average absolute amplitude of the nearest peak and trough, then the reflection amplitude qualifies as being near the zero crossing. If a reflection seismic data point is located near the zero crossing, that reflection seismic data point is less predictive of rock properties than a reflection seismic data point located further away from the zero crossing. Typically, if a reflection seismic data point is located near the zero crossing for a reflection phase angle data set other than the −90° phase angle data set, using the corresponding reflection seismic data point from the −90° phase angle data set will move the data point away from the zero crossing, thereby increasing its sensitivity toward rock property prediction. Thus, if it is determined in substep 142 that the reflection seismic data point is near the zero crossing, the program automatically goes to substep 144 and imports the −90° phase angle reflection seismic data point corresponding to the reflection seismic data point read in substep 140. After substep 144, the reflection amplitude, gradient, isochron, and sonic partition numbers can be read and defined for the −90° phase angle data point in substeps 145, 146, 148, 150, 152, 154, 156, and 158. In substep 160, the program asks whether the data point was near the zero crossing in substep 142. If the data point was near the zero crossing in substep 142, substep 162 identifies the reflection data subcell defined by the −90° phase angle partition number and the amplitude, gradient, isochron, and sonic partition numbers determined in substeps 146, 150, 154, and 158, respectively.

If it is determined in substep 142 (FIG. 19) that the reflection amplitude for the reflection seismic data point is not near the zero crossing, the program continues to steps 146 through 158 where the reflection amplitude, gradient, isochron, and sonic partition numbers are defined. In substep 160, the program asks whether the reflection seismic data point was near the zero crossing in substep 142. If the reflection seismic data point was not near the zero crossing, the program goes to step 164 and calculates the distance from the origin of an A-B crossplot to the position where the reflection seismic data point for that phase angle data set lands in A-B space. In substep 166, the program asks whether or not there is another phase angle data set to be read. If there is another phase angle data set, substep 168 imports the next phase angle data set and performs substeps 140 through 164 for the other phase angle data set(s). After the distance from the origin of the A-B crossplot to the reflection seismic data point in each phase angle has been calculated in substep 164, the computer compares these distances from each phase angle in substep 170. The program then automatically defines the partition phase number as the phase partition corresponding to the phase angle producing the greatest distance between the origin of the A-B crossplot and the reflection seismic data point on the A-B crossplot. Such a distance test is performed because data points spaced furthest from the origin on an A-B crossplot generally are more predictive of rock properties than data points located near the origin of the A-B crossplot. Thus, by selecting the phase angle having the data point located furthest from the origin of the A-B crossplot, the data point for that phase angle is more predictive of rock properties. After substep 170, the reflection data subcell defined by the reflection seismic amplitude, gradient, isochron, sonic, and phase partition numbers determined in steps 146, 150, 154,158, and 170 is identified in substep 162.

Referring again to FIG. 1, after inversion of the reflection seismic data in step 56, the outputted statistical pseudo log data sets can be viewed and manipulated using conventional seismic viewing tools.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventor hereby states his intent to rely on the Doctrine of Equivalents to determine and assess the reasonably fair scope of the present invention as it pertains to any apparatus not materially departing from but outside the literal scope of the invention as set forth in the following claims.

What is claimed is:

1. A computer-implemented method of predicting rock properties of a subsurface formation using reflection seismic data and well log data, said method comprising the steps of:

(a) generating synthetic seismic data from the well log data;

(b) quantizing the synthetic seismic data into discrete synthetic data subcells based on seismic attributes of the synthetic seismic data, said seismic attributes being predictive of rock properties;

(c) quantizing the reflection seismic data into discrete reflection data subcells based on the same seismic attributes that were used to quantize the synthetic seismic data;

(d) correlating each reflection data subcell with a corresponding synthetic data subcell based on the seismic attributes of the reflection and synthetic seismic data; and (e) assigning a statistical distribution of well log rock properties associated with the synthetic seismic data subcells to corresponding reflection data subcells.

2. The method of claim 1, said seismic attributes including at least three attributes selected from the group consisting of amplitude, gradient, phase angle, isochron, and sonic.

3. The method of claim 1, said seismic attributes including amplitude, gradient, and at least one additional seismic attribute predictive of rock properties.

4. The method of claim 1, said seismic attributes including amplitude, gradient, and phase angle.

5. The method of claim 1, said seismic attributes including amplitude, gradient, phase angle, isochron, and sonic.

6. The method of claim 1, step (b) including defining a number of partitions for each seismic attribute.

7. The method of claim 1, step (d) including applying dimensionless scalars to the seismic attributes of the synthetic seismic data or the reflection seismic data, said scalars being selected to scale the values of the seismic attributes of the synthetic seismic data and the reflection seismic data to best match one another.

8. The method of claim 7, step (d) including concurrently viewing histograms of at least one seismic attribute of the synthetic seismic data and the reflection seismic data, with said scalars being applied to either the synthetic seismic data or the reflection seismic data.

9. The method of claim 8, step (d) including adjusting the value of at least one of the scalars to cause a better fit between the histograms of said at least one seismic attribute of the synthetic seismic data and the reflection seismic data.

10. The method of claim 1, step (d) including importing actual well log data for a well located within a subsurface volume represented by the reflection seismic data, step (d) including selecting a subset of the reflection seismic data that corresponds to the location of the actual well log data, step (d) including assigning a statistical distribution of well log rock properties associated with the synthetic seismic data subcells to corresponding reflection data subcells of the subset of the reflection seismic data, step (d) including comparing the match between the rock properties assigned to the subset of the reflection seismic data and the rock properties from the actual well log.

11. The method of claim 1, said rock properties including porosity and pore fluid, said well log data being either actual well log data or hypothetical well log data.

12. A computer-implemented method of predicting rock properties of a subterranean formation using reflection seismic data and well log data, said method comprising the steps of:

(a) generating synthetic seismic data from the well log data;

(b) calculating synthetic seismic attributes from the synthetic seismic data, said synthetic seismic attributes including synthetic amplitude, gradient, and at least one additional synthetic attribute selected from the group consisting of synthetic phase angle, isochron, and sonic;

(c) calculating reflection seismic attributes from the reflection seismic data, said reflection seismic attributes including reflection amplitude, gradient, and at least one additional reflection attribute selected from the group consisting of reflection phase angle, isochron, and sonic;

(d) quantizing the synthetic and reflection seismic data into an equal number of synthetic and reflection data subcells so that each reflection data subcell corresponds to one synthetic data subcell based on the values of the synthetic and reflection seismic attributes; and (e) inverting at least a portion of the reflection seismic data by assigning well log data associated with the synthetic data subcells to reflection seismic data points landing in corresponding reflection data subcells.

13. The method of claim 12; and (f) between steps (d) and (e), assigning the well log data to appropriate synthetic data subcells.

14. The method of claim 13, step (f) including generating a statistical distribution of well log data for at least a portion of the synthetic data subcells.

15. The method of claim 14; and (g) analyzing the statistical distribution of well log data associated with the synthetic data subcells for statistical significance, thereby checking the appropriateness of the number of synthetic and reflection data subcells.

16. The method of claim 14, step (e) including assigning the statistical distribution of well log data associated with the synthetic data subcell to reflection seismic data points landing in corresponding reflection seismic data subcells.

17. The method of claim 12; and (h) between steps (d) and (e), applying scalars to the synthetic seismic attributes or the reflection seismic attributes to best match the values of the synthetic and reflection seismic attributes.

18. The method of claim 17; and (i) subsequent to step (h), comparing the scaled synthetic and reflection seismic attributes for corresponding synthetic and reflection data subcells, thereby checking the appropriateness of the scalars.

19. The method of claim 18, step (i) including concurrently viewing histograms of at least one synthetic and reflection seismic attribute for corresponding synthetic and reflection data subcells.

20. The method of claim 12, step (d) including defining a number of partitions for each seismic attribute, said number of synthetic and reflection data subcells being determined by the number of partitions for each seismic attribute.

21. The method of claim 20, step (e) including the substeps of:

(e1) reading a reflection amplitude value of a reflection seismic data point;

(e2) defining an amplitude partition number within which the amplitude value falls;

(e3) reading a reflection gradient value of the reflection seismic data point;

(e4) defining a gradient partition number within which the reflection gradient value falls;

(e5) reading an additional reflection attribute value of the reflection seismic data point;

(e6) defining an additional attribute partition number within which the additional reflection attribute value falls; and (e7) identifying the reflection data subcell within which the reflection data point lands based on the amplitude, gradient, and additional attribute partition numbers defined in substeps (e2), (e4), and (e6).

22. The method of claim 12, said well log data including porosity and pore fluid, said well log data being either actual well log data or hypothetical well log data.

23. A computer-implemented method of predicting lithology and pore fluid of a subterranean formation using reflection seismic data and well log data, said reflection seismic data representing a surveyed volume of the formation, said well log data being either actual well log data taken within the surveyed volume or hypothetical well log data estimating expected rock properties of the surveyed volume, said method comprising the steps of:

(a) generating synthetic seismic data from the well log data;

(b) calculating synthetic amplitude and gradient values from the synthetic seismic data;

(c) quantizing the synthetic seismic data into synthetic data subcells via partitioning of the synthetic amplitude and gradient values into user-defined numbers of amplitude and gradient partitions;

(d) assigning the well log data associated with the synthetic seismic data to the synthetic data cells so that a plurality of synthetic data subcells have a statistical distribution of the well log data associated therewith;

(e) observing the statistical distribution of the well log data for at least one synthetic data subcell to check the appropriateness of the number of amplitude and gradient partitions;

(f) calculating reflection amplitude and gradient values from the reflection seismic data;

(g) quantizing the reflection seismic data into reflection data subcells via partitioning of the reflection amplitude and gradient values into the same number of amplitude and gradient partitions as the synthetic amplitude and gradient values respectively;

(h) defining amplitude and gradient scalars for approximately matching the reflection amplitude and gradient with the synthetic amplitude and gradient respectively;

(i) comparing the fit between the synthetic amplitude and gradient and the reflection amplitude and gradient to check the appropriateness of the amplitude and gradient scalars; and (j) inverting the reflection seismic data by assigning the statistical distribution of the well log data from the synthetic data subcells to reflection seismic data points landing in the corresponding reflection data subcells.

24. The method of claim 23, step (j) including the substeps of:

(j1) reading a reflection amplitude value of a reflection seismic data point;

(j2) defining an amplitude partition number within which the reflection amplitude value falls;

(j3) reading a reflection gradient value of the reflection seismic data point;

(j4) defining a gradient partition number within which the reflection gradient value falls; and (j5) identifying the reflection data subcell within which the reflection seismic data point lands based on the amplitude and gradient partition numbers defined in substeps (j2) and (j4).

25. The method of claim 23, said well log data being hypothetical well log data.

26. The method of claim 25; and (k) importing actual well log calibration data taken within the surveyed volume;

(l) inverting a subset of the reflection seismic data to generate pseudo log calibration data, said subset of the reflection seismic data and said actual well log data representing approximately the same location in the surveyed volume; and (m) comparing the pseudo log data and the actual well log calibration data to check the appropriateness of the number of amplitude and gradient partitions and the appropriateness of the amplitude and gradient scalars.

27. A program storage device readable by computer, said device tangibly embodying a program of instructions executable by the computer for predicting rock properties of a subsurface formation using reflection seismic data and well log data, said program of instructions comprising the steps of:

(a) generating synthetic seismic data from the well log data;

(b) quantizing the synthetic seismic data into discrete synthetic data subcells based on seismic attributes of the synthetic seismic data, said seismic attributes being predictive of rock properties;

(c) quantizing the reflection seismic data into discrete reflection data subcells based on the same seismic attributes that were used to quantize the synthetic seismic data;

(d) correlating each reflection data subcell with a corresponding synthetic data subcell based on the seismic attributes of the reflection and synthetic seismic data; and (e) assigning a statistical distribution of well log rock properties associated with the synthetic seismic data subcells to corresponding reflection data subcells.

28. The method of claim 27, said seismic attributes including amplitude, gradient, and at least one additional seismic attribute predictive of rock properties.

29. The method of claim 27, said seismic attributes including amplitude, gradient, phase angle, isochron, and sonic.

30. The method of claim 27, step (b) including defining a number of partitions for each seismic attribute.

31. The method of claim 27, step (d) including applying dimensionless scalars to the seismic attributes of the synthetic seismic data or the reflection seismic data, said scalars being selected to scale the values of the seismic attributes of the synthetic seismic data and the reflection seismic data to best match one another.

32. The method of claim 31, step (d) including concurrently viewing histograms of at least one seismic attribute of the synthetic seismic data and the reflection seismic data, with said scalars being applied to either the synthetic seismic data or the reflection seismic data.

33. The method of claim 32, step (d) including adjusting the value of at least one of the scalars to cause a better fit between the histograms of said at least one seismic attribute of the synthetic seismic data and the reflection seismic data.

34. The method of claim 27, said rock properties including porosity and pore fluid, said well log data being either actual well log data or hypothetical well log data.

35. An apparatus for predicting rock properties of a subsurface formnation using reflection seismic data and well log data, said apparatus comprising: a computer programmed to carry out the following method steps;

(a) generating synthetic seismic data from the well log data;

(b) quantizing the synthetic seismic data into discrete synthetic data subcells based on seismic attributes of the synthetic seismic data, said seismic attributes being predictive of rock properties;

(c) quantizing the reflection seismic data into discrete reflection data subcells based on the same seismic attributes that were used to quantize the synthetic seismic data;

(d) correlating each reflection data subcell with a corresponding synthetic data subcell based on the seismic attributes of the reflection and synthetic seismic data; and (e) assigning a statistical distribution of well log rock properties associated with the synthetic seismic data subcells to corresponding reflection data subcells.

36. The method of claim 35, said seismic attributes including amplitude, gradient, and at least one additional seismic attribute predictive of rock properties.

37. The method of claim 35, said seismic attributes including amplitude, gradient, phase angle, isochron, and sonic.

38. The method of claim 35, step (b) including defining a number of partitions for each seismic attribute.

39. The method of claim 35, step (d) including applying dimensionless scalars to the seismic attributes of the synthetic seismic data or the reflection seismic data, said scalars being selected to scale the values of the seismic attributes of the synthetic seismic data and the reflection seismic data to best match one another.

40. The method of claim 39, step (d) including concurrently viewing histograms of at least one seismic attribute of the synthetic seismic data and the reflection seismic data, with said scalars being applied to either the synthetic seismic data or the reflection seismic data.

41. The method of claim 40, step (d) including adjusting the value of at least one of the scalars to cause a better fit between the histograms of said at least one seismic attribute of the synthetic seismic data and the reflection seismic data.

42. The method of claim 35, said rock properties including porosity and pore fluid, said well log data being either actual well log data or hypothetical well log data.

* * * * *